# United States Patent Office 3,751,344
Patented Aug. 7, 1973

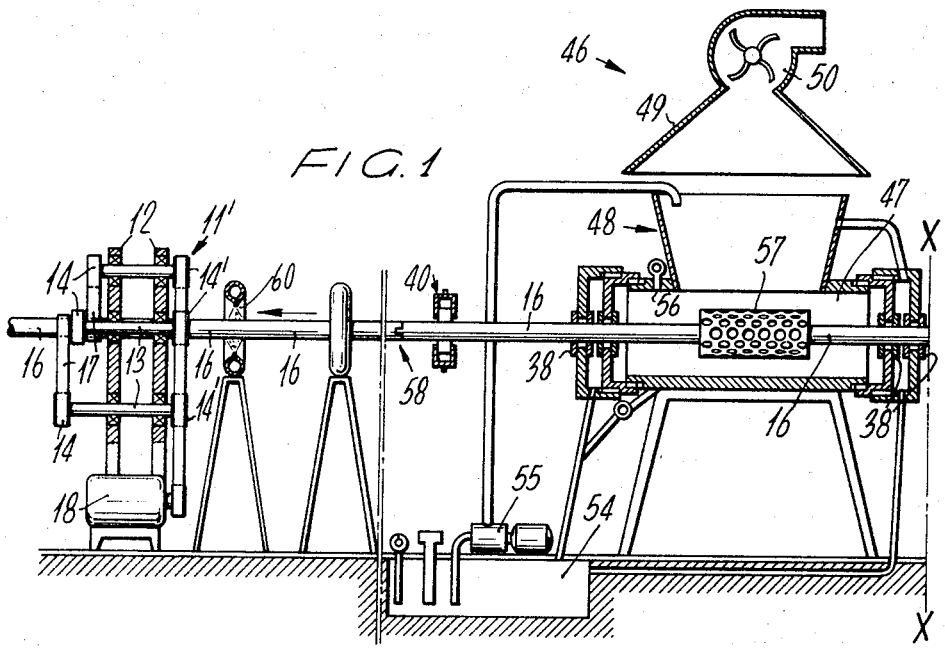
FIG. 1
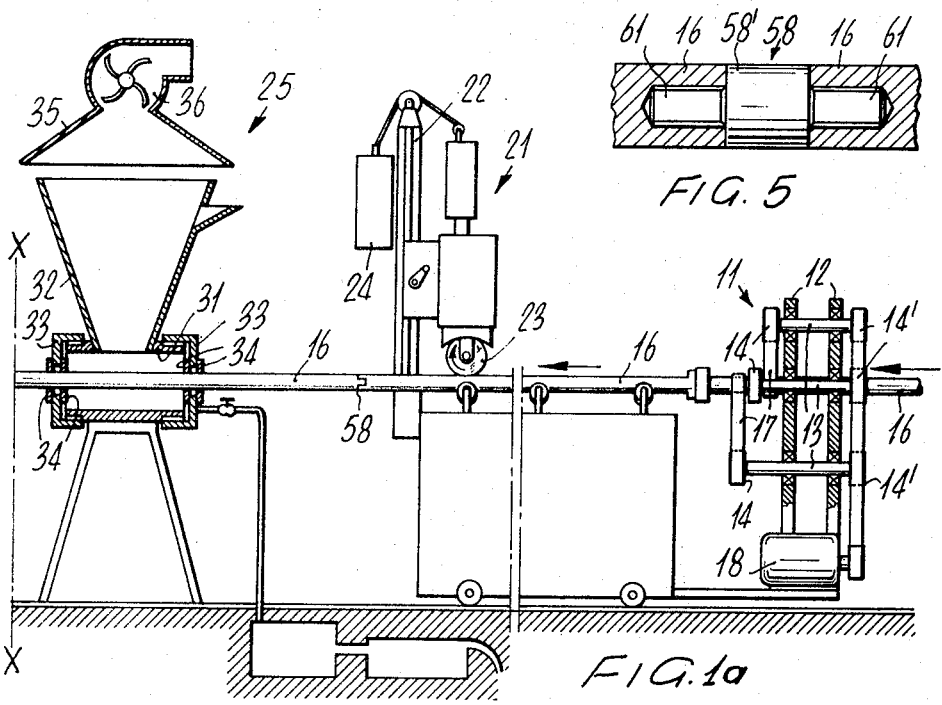
FIG. 1a
FIG. 5

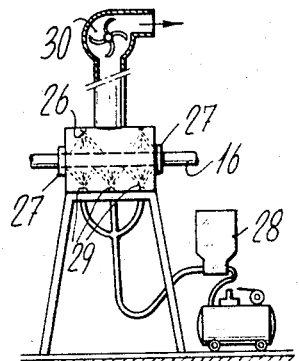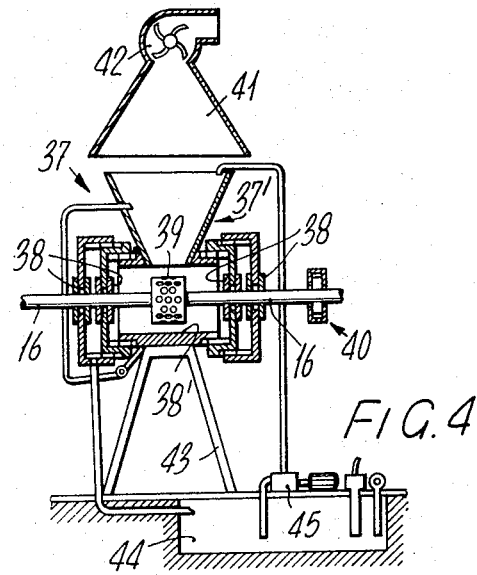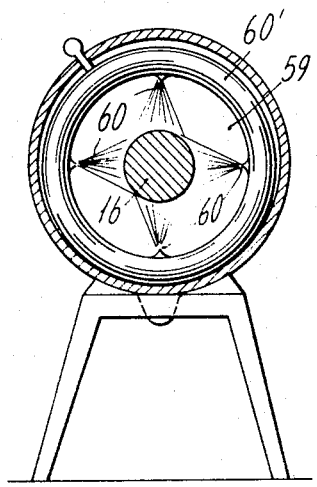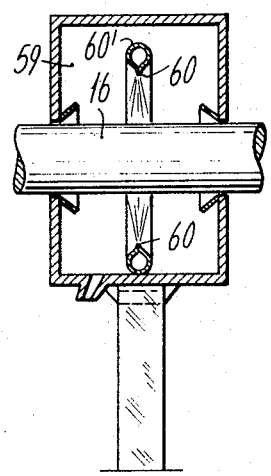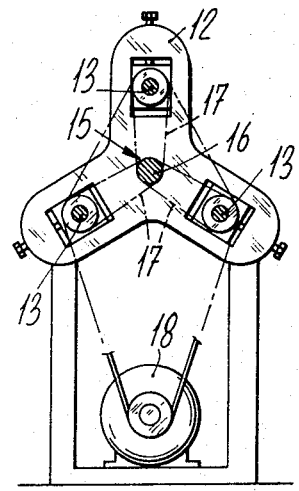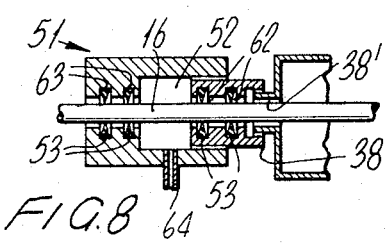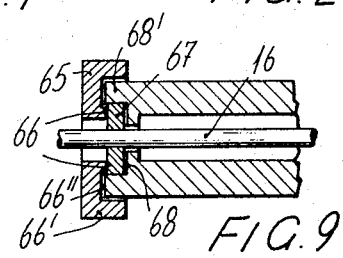

3,751,344
METHOD OF CARRYING OUT CONTINUOUS THICK CHROME PLATING OF BARS
Sergio Angelini, Via M. F. Quintiliano 15, Milan, Italy
Filed Nov. 13, 1970, Ser. No. 89,428
Claims priority, application Italy, Nov. 15, 1969, 24,464/69
Int. Cl. B01k 3/00; C23b 5/56, 5/58
U.S. Cl. 204—28
7 Claims

ABSTRACT OF THE DISCLOSURE

Method and apparatus are provided for the continuous thick chrome plating of bar, wire, or tube, both externally and internally, which provides providing a continuous series of said bars, wires, or tubes, passing said continuous assembly through pretreatment areas, chrome plating areas and post-treatment areas and providing in the coating area either an anode or a cathode with the continuous assembly acting as the other electrode.

---

Hitherto, methods of carrying out thick chrome plating of bar, wire and tube, and in the case of the latter kind of product both externally and internally, have been executed by immersing the individual items to be chrome-plated in various baths or vessels, and at the best these processes have used no more than rudimentary degrees of automation.

The object of the present invention is a process which makes possible the continuous chrome-plating not only of bar material but also of wire and tube and, in the case of the latter makes it possible to substantially increase the production rate and therefore as a direct result of this, to reduce the production cost. Another major advantage of the novel process resides in the uniformity of deposition of the chrome layer on the components being plated, thanks to the uniformity of movement of the component in question past the anode, the whole being immersed in the chromic acid solution and moving at the same time.

Traditional chrome plating, carried out by immersion only, always gives rise to irregularities in the thickness of the chrome plate, due to the varying values of electrical resistance presented by the anode over its total length, this especially when chrome plating components which have substantial longitudinal dimensions.

This drawback of the traditional systems is overcome by connecting the anode being appropriately shaped, and by adopting other artifices of a kind suggested by practical experience.

Using the method of the present invention, however, all these drawbacks are overcome and at the same time the benefit of substantial advantages, both technological and economic, is obtained. The process consists in passing tube, bar, wire, or a continuous stream of articles, for chrome-plating, through the anode which is made of conventional materials such as a lead-antimony-silver alloy, platinum-plated titanium etc. The sections of tube, bar or wire can be connected together longitudinally, i.e. in succession, upstream of the processing station and then disconnected downstream of it, being passed in submerged fashion, at the pr-established rate, through a tight vessel containing the chromic acid solution of appropriate strength at a stabilised temperature. Generally speaking, the anode will have a toroidal cross-section so that ion exchanges produced simultaneously over the whole of the area of the item being chrome-plated, said item passing through said area, at the same time, too, the continuous stream of components for chrome-plating preferably being rotated around its own longitudinal axis in order to contrive more uniform distribution of the chrome over the surface and also to prevent any hydrogen bubbles, which may develop during the process, from being trapped on the lower part of the component being plated with consequent irregularities in plating. Using this process, components which are perfectly chrome-plated and, above all, have a strictly constant chrome thickness (it being possible to establish right from the start, the thickness which is required, this of course being a function of the current, the bath temperature and, more especially the time of immersion of the component in the bath, the latter factor being linked directly with the rate of transfer of the component (bar, tube, wire or stream of articles) being plated).

Detailed studies and experiments carried out over a period of many years, have been made by the inventor in developing this continuous chrome-plating process, which is one of major importance in the specific field concerned, since it differs completely from the chrome-plating system hitherto employed and produces a product having characteristics which are clearly superior to those obtained in components chrome-plated by the traditional static immersion plating systems.

Moreover, this novel continuous method includes automation and single flow line production, this extending equally to the other operations required such as preparing the component for chrome-plating and finishing off the plated product.

In particular, a preparatory emery operation and a roughening or shot-blast operation (the latter is carried out using chemical or electrolytic etching of the surface to be plated), are used, following which the component is washed by high-pressure water jets; this being followed by drying by passing the item through devices preferably constituted by pairs of felts which are loaded into contact with one another. After this preparatory treatment, the component passes through the chrome-plating chamber proper, this consisting, depending upon the case of course, of a completely closed vessel with sealing glands through which the component being chromed passes continuously. In the case of wire, preferably an open vessel will be used because of the inherent flexibility of the wire. Inside the vessel in which chrome-plating takes place, there is an anode of substantially cylindrical form and preferably toroidal section, through which the component being chrome-plated (tube, bar, wire etc.), continuously passes. Obviously, the cathode is constituted by the component being chrome-plated, this being electrically connected to the negative terminal of a D.C. power source, whilst the anode is connected to the positive terminal of said same source. During the passage of the component past the adjacent surface of the anode, chrome is deposited upon the surface of said component (tube, bar, wire, etc.), the chrome-plating vessel being completely full of chromic acid, the anode being immersed in the solution and thus, too, the component being chrome-plated, which acts as cathode. On exit from the chrome-plating vessel, still in a continuous operation, a final washing operation is carried out on the component (bar, tube or wire), in order to remove any residue of chromic acid, this being followed by drying and, finally, by polishing with brushes, preferably rotating ones or the like, in order to give the component the desired finish and enable it to be marketed without need for any further operations.

The process of chrome-plating the internal surfaces of tubes, takes place using the same method used for chrome-plating bar, wire or tube exteriors, with the exception that in this case it is the anode which is moved in relation to the cathode, namely the component being chrome-plated. Processes similar to those described hereinbefore are used, too, for preparing the internal wall of tube material prior to chrome-plating, and for finishing same after plating has taken place.

Another major feature of the invention, which is an integral part of the novel process, resides in the fact that there is continuously carried out on the component being chrome-plated, both electrolytic and chemical etching. In order to carry out electrolytic etching, the component being plated must be passed through a vessel similar to that used for the chrome-plating proper but of preferably smaller size. In order to carry out electrolytic etching, the polarity is reversed.

The detailed description of the process will be rendered more easily understandable from a consideration of the drawings given here by way of non-limitative example and illustrating three continuous chrome-plating plants, that is to say one for chrome-plating the external surface of bar and tube, one for wire and one for chrome-plating the internal surface of tube, respectively. In the attached drawings:

FIG. 1 taken with FIG. 1a is a complete elevation of all the machines involved in the production line for the continuous chrome-plating of bar and the external surface of tube;

FIG. 2 is a front elevation of the emerying machine which forms part of the production line set out in FIG. 1;

FIG. 3 illustrates a side view of the machine for roughening the surface (sand-blasting in fact), which machine forms part of the production line of FIG. 1;

FIG. 4 illustrates a side view of a roughening machine (in fact the surface is roughened by electrolytic etching), forming part of the production line of FIG. 1;

FIG. 5 illustrates an insulating coupling for connecting two bar sections together, this also forming part of the production line of FIG. 1;

FIG. 6 is a partially sectioned frontal view of a machine for washing the chrome-plated bars, said machine forming part of the production line of FIG. 1;

FIG. 7 is a sectional lateral view of the machine in FIG. 6, which forms part of the production line of FIG. 1;

FIG. 8 is a longitudinal section through a two-way gland, namely a wire gland;

FIG. 9 illustrates a longitudinal section through a variant embodiment of the wire gland shown in FIG. 8;

Figure 11:
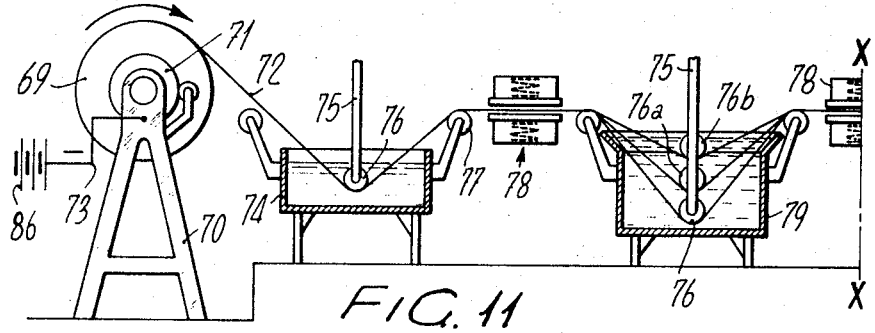
Figure 11A:
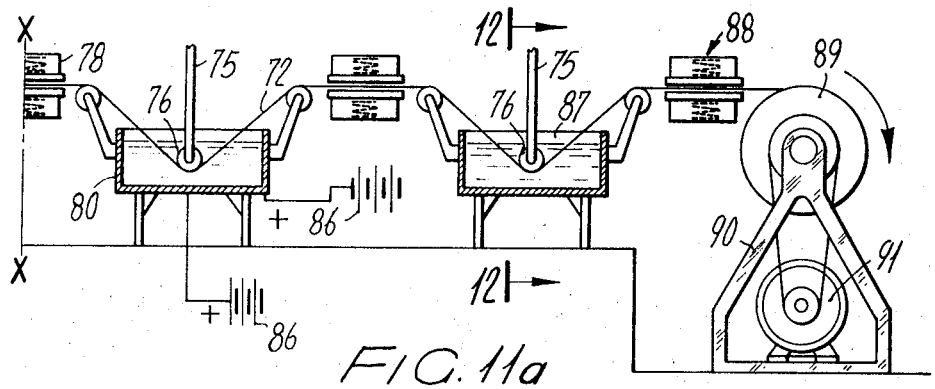
Figure 12:
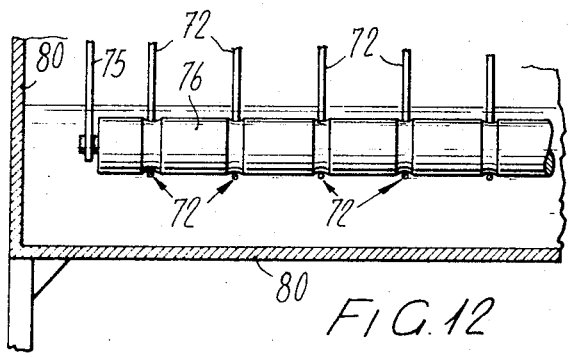
Figure 10:
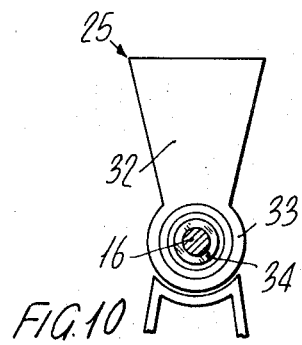
FIG. 10 is a frontal view of the machine marked 25 in FIG. 1, for carrying out roughening by chemical etching.
Figure 13:
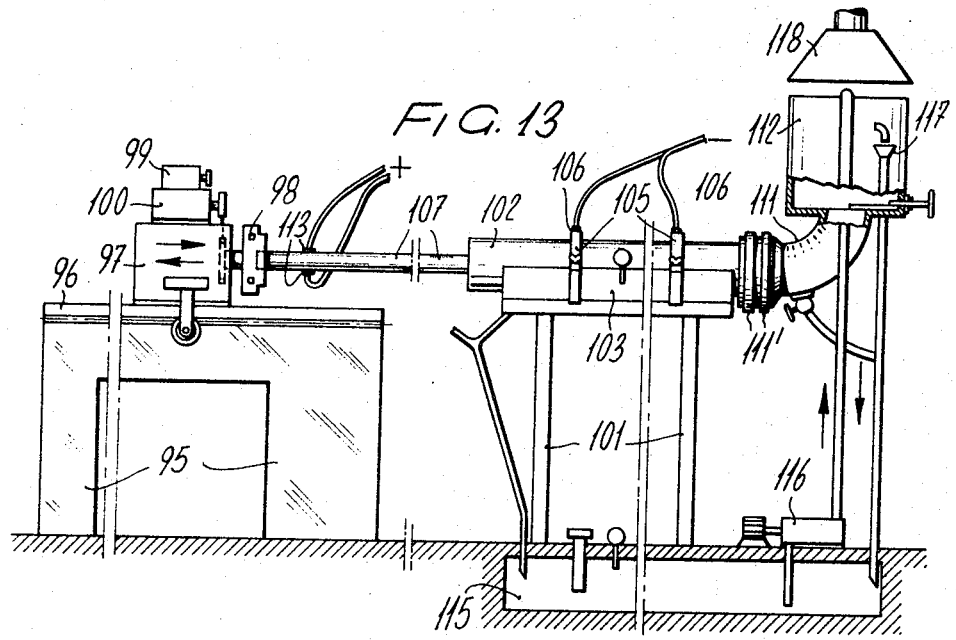
Figure 14:
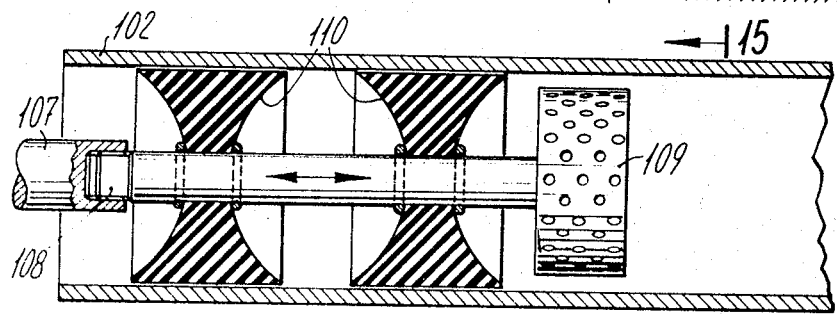
Figure 15:
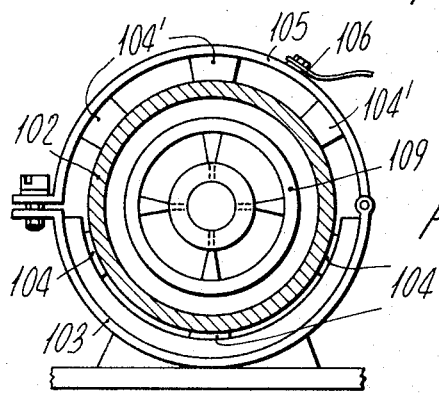

FIG. 11 taken with FIG. 11a is a side view of the full production line for the continuous chrome-plating of wire or cable;

FIG. 12 illustrates a transverse section on the line 12—12 of FIG. 11, showing the routing of the wire or cable during the chrome-plating in a vessel, and showing too how the idle roller contains several grooves for the simultaneous passage of a plurality of wires for chrome-plating;

FIG. 13 illustrates a side view on the production line assembly with all the components required for the chrome-plating of the internal surface of tube;

FIG. 14 illustrates a longitudinal and enlarged section of the anode head and the seals for traversing through the interior of tube whilst carrying out internal chrome-plating;

FIG. 15 illustrates a transverse section on the line 15—15 of FIG. 14, through the tube being chrome-plated, in which the details of how the tube is secured and of the frontal part of the anode head, can be seen.

The continuous chrome-plating production line for bar and tube, in accordance with the invention (FIG. 1), is made up of a number of separate operating stations which are responsible for the various operations required in order to effect continuous chrome-plating of a bar, namely:

(a) An emery unit 11 designed to prepare the surface of the bar 16 being chrome-plated, FIG. 2 illustrating a section thereof. This emery unit is made up substantially of a twin metal frame carrying three shafts 13 each with two series of pulleys 14 and 14' located radially around a central hole 15 through which the bar 16 being processed, passes. The three pulleys 14' of the downstream part, are also arranged, as an inspection of FIG. 1, will show in three mutually parallel planes. Around these pulleys and the bar 16 being processed, emery belts 17 with the emery surface facing inwards, are arranged. The three shafts 13, being equipped with two ball-bearings assembled on the twin frame 12 and slidable and lockable in relation thereto, are fitted in the upstream direction with three pulleys 14' connected to a transmission belt driven by an electric motor 18. The speed of operation is determined in accordance with the metal being processed.

(b) A drive unit 21 which produces the bar feed, is constituted by a body slidable on vertical guides 22 and comprises: an electric motor, a continuously variable step-down gearing arrangement, a soft rubber roller 23 which grips the bar 16 which is being fed. The unit thus formed is provided with a counterweight 24 which facilitates vertical displacement. The rubber roller 23, if arranged so that its axis is not at right-angles to the axis of the bar 16, will not only produce forward feed of the bar but also simultaneous rotation therein, about its own axis.

(c) A unit 25 designed to facilitate chrome-plating of the surface of the bar 16 by superficial roughening in the form of chemical etching or by sand-blasting or by electrolytic etching. The unit for carrying out roughening by chemical etching, is shown in side elevation in FIG. 1 and marked 25, being constituted by an etching chamber 31 with a horizontal axis and made of plastic material, the chamber having a cylindrical form and being connected at the top to a hopper 32 containing acid for the process. The end walls 33 of the chamber 31 are perforated at the centre to pass the bar 16 being processed and are fiitted with special glands or seals 34 which prevent the acid from escaping. A top cover 35 with an exhauster 36 is provided to draw off the fumes.

The roughening unit which employs sand-blasting, indicated by way of example in FIG. 3, is constituted by a sand-blasting chamber 26 in the form of a horizontal axis tube lined internally with plastic material in order to resist the effect of the sand-blasting operation. Through this chamber 26, the bar 16 being processed, passes longitudinally. The ends of the sand-blasting chamber are closed by glands perforated centrally at 27 and fitted with seals to prevent the escape of sand during the transfer of the bar 16 which is to be chrome-plated. A conventional sand-blaster 28, connected to the nozzle located inside the sand-blasting chamber 26, completes the apparatus which is connected to a sand exhauster 30.

In FIG. 4, the electrolytic etching unit 37 for producing surface roughening or a surface key, which can be substituted for the unit 26, is constituted by a tube 38' with a horizontal axis and an upper hopper 37' through which the bar 16 being processed, passes. The terminal parts of the tube 38' are externally threaded in order to receive centrally holed-out gland plugs equipped with special packings 38, separately described in two embodiments. Inside said tube 38' there is installed a ring-cathode 39 with a perforated surface, of appropriate diameter. The perforation of the walls of the cathode is necessary in order to promote the escape of the gases which are developed during electrolytic etching. The cathode 39 will, as circumstances dictate, be made of a lead-antimony-silver alloy or for that matter of platinum-plated titanium. The bar 16 does duty as anode, passing inside the cathode 39 so that its surface is subjected to a greater or lesser degree of electrolytic etching, depending upon the rate of feed. The current through the anode, that is to say through the bar 16, is transmitted through appropriate rotating and sliding brushes or jaws 40, which can be designed to accord with the bar section. On the top part of the hopper there is installed a cover 41 with an exhauster 42 for removing the fumes. The whole apparatus is carried by a profiled metal frame 43 whose height is such as to bring it into alignment with the other units forming part of the production line through which the bar 16 is continuously fed. Below there is a reservoir 44 containing the liquid used for the electrolytic etching, said reservoir being equipped with a pump 45 for the continuous circulation of said liquid. The temperature of the liquid used for chemical etching, will be established as the case requires, in accordance with the diameter of the product being chrome-plated.

Another unit which is an essential part of the production line is the one marked 46 in FIG. 1, this unit being the actual chrome-plating unit and comprising a chamber 47 of tubular form with its axis horizontally disposed, connected at the top part to the hopper 48 which is responsible for channelling the gases developed during the process, towards the cover 49 located above, with its exhauster 50, and for holding the liquid required by the chrome-plating operation. The extremities of this chrome-plating chamber 47 are provided with threaded portions for the attachment of centrally holed-out glands 38 through which the bar 26 for chrome-plating, passes. Around the outside of these gland plugs 38, as FIG. 8 shows, other gland plugs 51 are arranged, likewise through the medium of a leakproof screw-thread and likewise centrally holed-out, in order to form a cavity 52 in which to collect any liquid which may be entrained by the bar 16 on exit from the process. The gland plugs 38 and 51 are provided with plastic seals or packings 53. The machine is equipped with a reservoir 54 for the chromic acid, the reservoir being equipped with a pump 55 of non-corrosible material which is immersed in said reservoir and maintains the liquid level required for chrome-plating, in the chamber 47, the latter also being equipped with a device 56 for automatically monitoring the temperature of the liquid during the operation. Inside the chrome-plating chamber 47 an anode 57 is located, identical to the cathode 39 of FIG. 4 hereinbefore described but of a different length, the length being designed as a function of the time for which the bar 16 remains in the chamber. The length of the chamber 47 in which chrome-plating takes place, is designed to accord with the rate of feed of the bar 16 and the desired thickness of chrome-plate. The direct current required is supplied by rotary generators or static transformers.

It is important to bear in mind that between the machine 37 (FIG. 4) for carrying out electrolytic etching, when this kind of process is employed, and the continuous chrome-plating machine 46 (FIG. 1), it is necessary to reverse the polarity of the bar; for this reason, a suitable device is arranged between the two machines 37 and 46 which are spaced at a suitable interval from one another. The continuous bar 16 is made of a series of bar sections connected to one another by coupling 58 (FIG. 5), these latter insulating each bar section from its neighbour and thus enabling the polarity to be reversed. On exit from the chome-plating chamber 47, the bar 16 is washed by the machine shown in FIGS. 6 and 7, this constituting a cylindrical washing chamber 59 the glands of which are axially holed out in order to pass the bar 16 for washing. Inside the washing chamber a series of nozzles or jets 60 are provided through which high-pressure water jets are sprayed, the water coming from a ring main 60'.

A following machine then carries out drying. This machine is substantially the same as that described hereinbefore for the washing operation, with the difference that the nozzles produce hot air.

The production line is then completed by a machine 11' which is identical to that 11 shown at the head of the line 1, which is equipped with emery belts of the desired grade in order to finish off and polish the processed bar.

The production line then terminates in a standard wrapping machine, not shown in FIG. 1, which wraps the bar in a continuous protective band.

The continuity of working is a feature of particular interest and is obtained by coupling separate bar sections together using insulating couplings of the kind marked 58 (FIG. 5). Couplings or joints of this kind are made of insulating material and take the form of a cylinder 58' of appropriate length and having the same section as the bars 16 being coupled, the two ends of the coupling being provided with screw-threads of smaller section 61, which are screwed into tapped holes in the ends of said bar sections 16.

In FIGS. 8 and 9, sealing rings of the lip type or wire glands, have been shown, which are fitted to the ends of the roughening chamber (electrolytic etching) 37 in FIG. 4, and to the ends of the chrome-plating chamber proper, 46, shown in FIG. 1.

These glands can be of two types. The first type (FIG. 8) takes the form of a first part 38 which is screwed in sealed fashion onto the tube 38'. This cylindrical part has two internal undercuts 62 in which there are lodged two sealing rings 53 of plastic material. Outside said first part a second part is also screwed on, namely the second gland section 51, which, in internal undercut 63, contains two sealing rings 53 like the ones just referred to. The bar 16 being chrome-plated, passes through the two pairs of seals 53.

Between the two glands a cavity 52 is formed which collects any acid which the bar 16 may carry pass the seals 53, this acid being collected and recirculated, or alternatively eliminated through the pipe 64.

The second kind of gland, shown in FIG. 9, is constituted by a screwed plug 65 with an annular spigot 66 around the central orifice, and a peripheral spigot 66', the two spigots determining between them an annular channel 66" into which there penetrates the spigot end 68' of the hopper tube, thus creating a seat 68 in which there is assembled and trapped, an annular seal 67 of plastic material. When the gland plug 65 is screwed onto the end 68' of the hopper tube, the spigot surrounding the internal orifice compresses the plastic seal 67 causing it to fit snugly up against the bar 16 passing through it.

Let us now consider the processing of wire, as shown in FIG. 11, at least one wire (but preferably more) is wound on a reel 69 carried rotatably on a mounting 70. This is equipped with a brake 71 by means of which it is possible to regulate the wire tension. Connected to the reel 69 in a similar manner, there is an electrical contact 73 which establishes connection with a D.C. electrical power source 86, in particular with the negative terminal thereof, in order to make the wire operate as cathode.

The wire, on leaving the reel 69, enters the first vessel 74 where it is kept immersed by the rod 75 at the end of which there is an idle roller 76 of plastic material, preferably Teflon, the rod 75 also being made of this material; the roller 76 can be substituted by superimposed pulleys 76–76a–76b, as shown in the vessel 79 in FIG. 11. All the other components of the production line where possible, can also be coated with plastic material or made directly in such material, in order to prevent them being attacked by the acid substances employed in the process. The first vessel 74 contains water which has been acidified using various acids, this producing upon the surface of the wire which is to be chrome-plated, a slight etching effect (or slight scaling in the case of ferrous material). The wire then passes around a second roller 77 located at the edge of the vessel 74, this likewise being an idle roller and being made of plastic material, following which the wire passes through a pair of felts 87 which are loaded together and dry the liquid from the wire. Using devices and processes similar to those described hereinbefore, the wire is then passed into the following vessel 79 which contains water only and is provided to remove from the external surface of the wire any residues of acid, the wire then passing into the vessel 80 in the same way through similar devices, this vessel containing the chromic acid solution.

The vessel 80, preferably made of lead or some other material suitable for operation as an anode, is connected to the positive terminal of the aforesaid D.C. power supply 86, this exclusively for thick wire, and operates as the anode. The vessel 80 is dimensioned as a function of the rate with which the wire is fed so that the time of dwell of the wire in the vessel corresponds with the time required to deposit upon the external surface thereof the requisite thickness of chrome.

The wire then enter the vessel 87 where it is washed by high-pressure water jets and by other suitable means, passing then through a pair of felts 88 which dry it and at the same time polish it, following which it is coiled on the reel 89 carried on the mounting 90 and driven by a motor 91, the latter possibly being equipped with step-down gearing. This design has been described purely by way of a non-limitative illustration of the invention, and the process can of course be carried out using other accessory of intervening means. In particular, the vessel 80 may be open or closed, as long as it contains a cylindrical perforated anode through which the wire can be passed.

In order to chrome-plate the internal walls of tube or hollow bar, the system likewise operates in a continuous manner and indeed in a manner similar to that described in relation to bar and wire, although there are some modifications to be made in order to achieve the deposition of chrome on the internal surfaces.

The machine (FIG. 13) consist of a table 95 carrying two horizontal guides 96 from which a carriage 97 with a self-centering chuck at its front end, can move. Forming part and pacel of said carriage are a motor 99, a reduction gear and continuously variable gear 100 for moving the chuck 98. The carriage 97 is also equipped with a device for advancing it and with a device for varying the rate of advance or feed along the guides 96 on the table 95. The length of the guides is determined by the length of the tube sections which are to be processed.

In the self-centering chuck 98, a bar 107 is fixed which has approximately the same length as the tube 102 to be processed. On the end of this bar, a special component in the form of a rod 108 (FIG. 14) with an anode head at the end in the form of a perforated annular anode 109 (made of lead or platinum-plated titanium) of appropriate thickness and section for the section of the tube being processed, is fixed. On said rod 108, there are arranged two circular seals 110 of plastic material or some material which will resist acid attack, these seals having diameters equal to the internal diameter of the tube 102 being processed, and serving to prevent the chrome-plating solution contained inside the tube 102, from escaping.

The tube 102 or the hollow component being processed, is assembled during the chrome-plating operation, on supports 101 (FIG. 13) through a saddle 103 (FIG. 15) inside which spacers 104 and electrical resistors for maintaining the internal temperature of the tube 102 constant, are arranged, the tube resting in the saddle 103 during the operation. The saddle 103 is provided at the top, with two jaws 105 which can open and which in turn are provided inside with three or more spacers 104' connected to one terminal of a D.C. power supply. The jaws 105 are used to clamp the tube 102 being plated, internally onto the saddle 103 whatever its diameter or its external shape, and also to transmit to it the requisite electrical polarity. Into one end of the tube 102 being plated, the anode head 109 with its associated seals 110 is inserted. The other end of the tube 102 is connected by a flexible pipe 111 (FIG. 13) and clips 111' which provide a seal, to a vertical reservoir 112 where the chrome-plating solution is maintained at constant level and temperature. In this fashion, the tube 102 being chrome-plated is completely filled with said solution. By starting the carriage 97 so that it translates along its guides 96 with the chuck 98 rotating, the anode head 109 is made to advance through the interior of the tube 102. The supply of direct current is obtained by connecting a rectifier or other direct current source, to the bar 107 carrying anode head 109, through contact brushes 113, and to the tube being plated, through fixed contacts 106 on the jaws 105 of the saddle 103. By applying the negative side of the power supply to the mobile anode head 109 and the positive side to the tube 102 being plated, an etching or corroding process is created by which, with the rate of feed of the anode head 109 inside the tube 102 established and with simultaneous rotation of said head, there is produced on the internal wall of the tube 102 an electrolytic etching effect the purpose of which is to prepare the surface to receive the requisite thickness of chrome-plate. When the anode head 109 has traversed completely through the interior of the tube 102, up to the other end, the polarity of the D.C. applied to the anode head 109 and to the tube 102, is reversed in order to reverse the anode and cathode rolex. The direction of travel of the carriage 97 is reversed so that the anode head 109 moves back right through the length of the tube at a predetermined rate. The electrolysing process is then started, and this produces the deposition of the requisite thickness of chrome on the internal surface of the tube 102. When the chrome-plating operation has been completed, and the carriage 97 carrying the bar 107 returned to the starting point (the bar 107 carries the anode head 109), the processed tube 102 is emptied of the chrome-plate solution and, in place of the anode head, a rotary brush of appropriate material is fitted, this being used to polish the internal chromed surface of the tube 102. This done, the next tube for processing is placed in position.

The production line is completed by a vessel 115 for the chromic acid solution, which is maintained at a constant temperature and has appropriate automatic temperature control arrangements; by an electric pump unit 116 designed to handle acid, this supplying the plastic reservoir 112 which is connected to the tube 102 being chrome-plate, and maintaining the chromic acid solution at a constant level in said reservoir. A cock 117 is provided to connect the reservoir to the vessel and has an overflow function. A cowl 118 with an associated exhauster is installed above the plastic reservoir 112 in order to draw off the gases which develop during the processes of etching and chrome-plating..

The description given hereinbefore, of the three production lines, are intended merely as an indication and are in no way limitative of the scope of the invention.

What is claimed is:

1. A method for continuously chrome electroplating a plurality of elongated bars comprising serially mechanically attaching said bars together by couplings of the same section as said bars to provide a generally continuous electro platable surface, serially cleaning said attached bars prior to plating by passing same consecutively through a cleaning medium and serially passing said attached bars into and through a chrome electroplating bath whereby the bars are chrome plated.

2. The method of claim 1 wherein said articles are serially attached by an insulating member.

3. The process of claim 1 wherein said cleaning includes the step of surface roughening.

4. The process of claim 3 wherein said surface roughening is affected by sandblasting.

5. The process of claim 3 whereby said surface roughining is affected by chemical etching.

6. The method of claim 3 wherein said surface roughening is affected by electrolytic etching.

7. The method of claim 1 wherein said serial attaching of said bars together is effected by providing mating screw threads on said coupling and said bars and mating said threads.

(References on following page)

References Cited

UNITED STATES PATENTS

| | | | |
|---|---|---|---|
| 1,733,404 | 10/1929 | Fahrenwald | 204—26 |
| 1,904,432 | 4/1933 | Fink | 204—26 |
| 2,509,304 | 5/1950 | Klein | 204—28 |
| 2,859,157 | 11/1958 | Curtiss, Jr. | 204—26 |
| 1,803,691 | 5/1931 | Brockway | 204—51 |
| 1,745,912 | 2/1930 | Richardson | 204—51 |
| 1,953,484 | 4/1934 | Iredell | 204—207 |
| 2,377,550 | 6/1945 | Hall | 204—207 |
| 2,823,180 | 2/1954 | Rothschild | 204—207 |
| 1,793,069 | 2/1931 | Dunkley | 204—224 |
| 1,850,426 | 3/1932 | Tyrrell | 204—26 |
| 1,927,162 | 9/1933 | Fiedler et al. | 204—26 |
| 1,805,215 | 5/1931 | Hammond | 204—224 |
| 1,809,826 | 6/1931 | Bohlman | 204—224 |

FOREIGN PATENTS

| | | | |
|---|---|---|---|
| 1,023,649 | 1/1958 | Germany | 204—207 |
| 138,444 | 7/1960 | Russia | 204—224 |

JOHN H. MACK, Primary Examiner

T. TUFARIELLO, Assistant Examiner

U.S. Cl. X.R.

204—26, 207